United States Patent [19]
Pontius, Jr.

[11] Patent Number: 5,456,277
[45] Date of Patent: Oct. 10, 1995

[54] VIDEO CAMERA ENCLOSURE

[76] Inventor: Wilson J. Pontius, Jr., 7517 Carolton Cir., Tampa, Fla. 33619

[21] Appl. No.: 352,394

[22] Filed: Dec. 8, 1994

[51] Int. Cl.⁶ .................................................. E04H 15/04
[52] U.S. Cl. .......................... 135/90; 150/154; 354/64; 135/96
[58] Field of Search ................................. 135/96, 91, 90, 135/115; 150/154, 161, 165; 352/242; 354/64, 75, 76

[56] References Cited

U.S. PATENT DOCUMENTS

| | | |
|---|---|---|
| D. 256,515 | 8/1980 | Honeycutt . |
| 3,036,506 | 5/1962 | Andresen, Jr. . |
| 3,879,742 | 4/1975 | Smith . |
| 4,033,392 | 7/1977 | Less . |
| 4,176,701 | 12/1979 | Welgan . |
| 4,673,267 | 6/1987 | Erxleben ................................ 352/242 |
| 5,087,934 | 2/1992 | Johnson ................................... 354/64 |
| 5,159,366 | 10/1992 | Gell, Jr. ................................. 354/64 |

*Primary Examiner*—Lanna Mai

[57] ABSTRACT

A video camera enclosure includes an L-shaped support bracket that is securable to a top portion of a video camera. An adjustable securement screw extends outwardly from an upper vertical extent. The adjustable securement screw is capable of extending outwardly in a variety of lengths. Contained in the device is a rectangular support bracket having having a hollow opening. The support bracket is secured to the adjustable securement screw of the L-shaped support bracket. A lens of the video camera aligns with the hollow opening. A flexible plastic enclosure is secured around the rectangular support bracket exposing only the hollow opening thereof. The plastic enclosure extends outwardly to encompass the video camera and a head of a user to protect the camera and the head from inclimate weather.

6 Claims, 4 Drawing Sheets

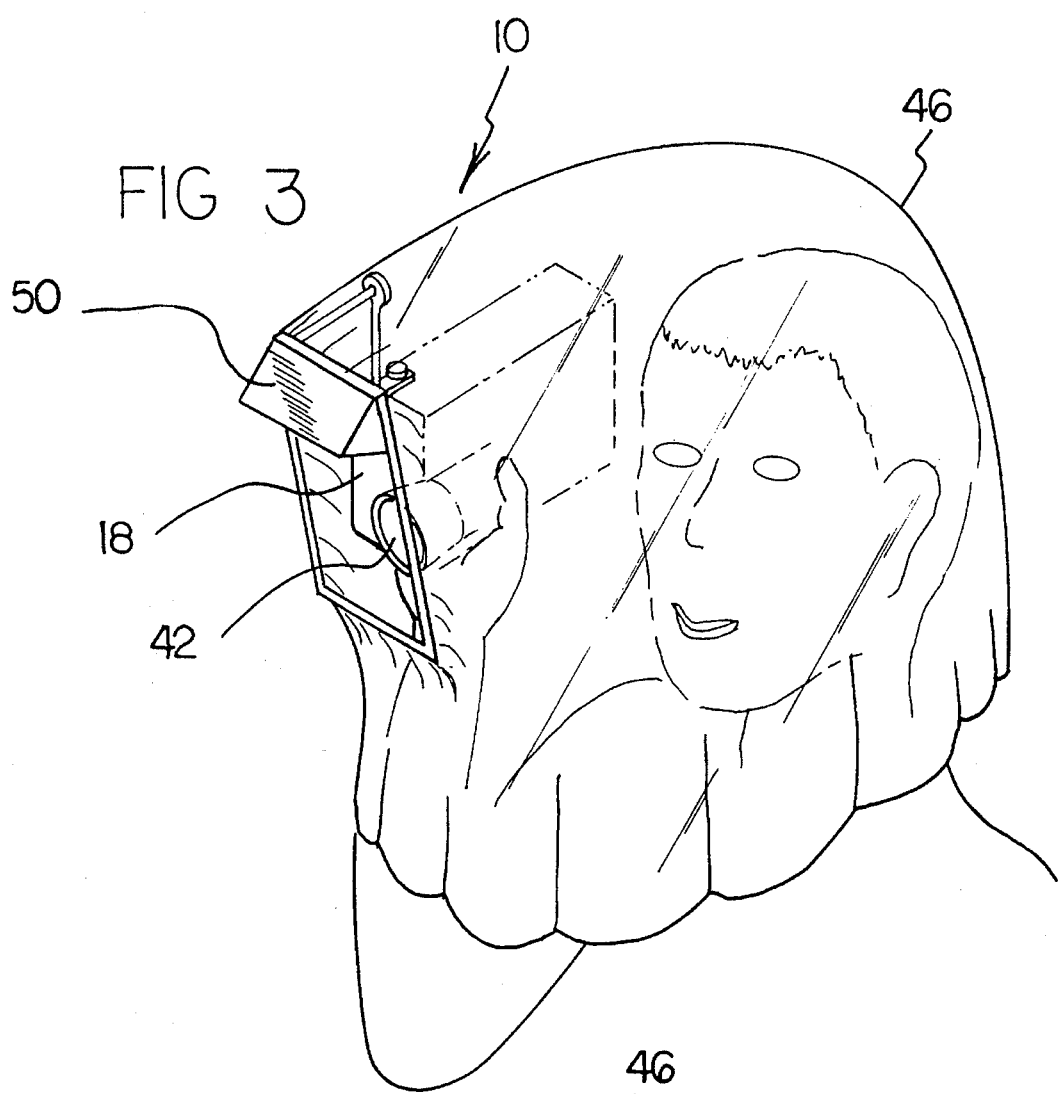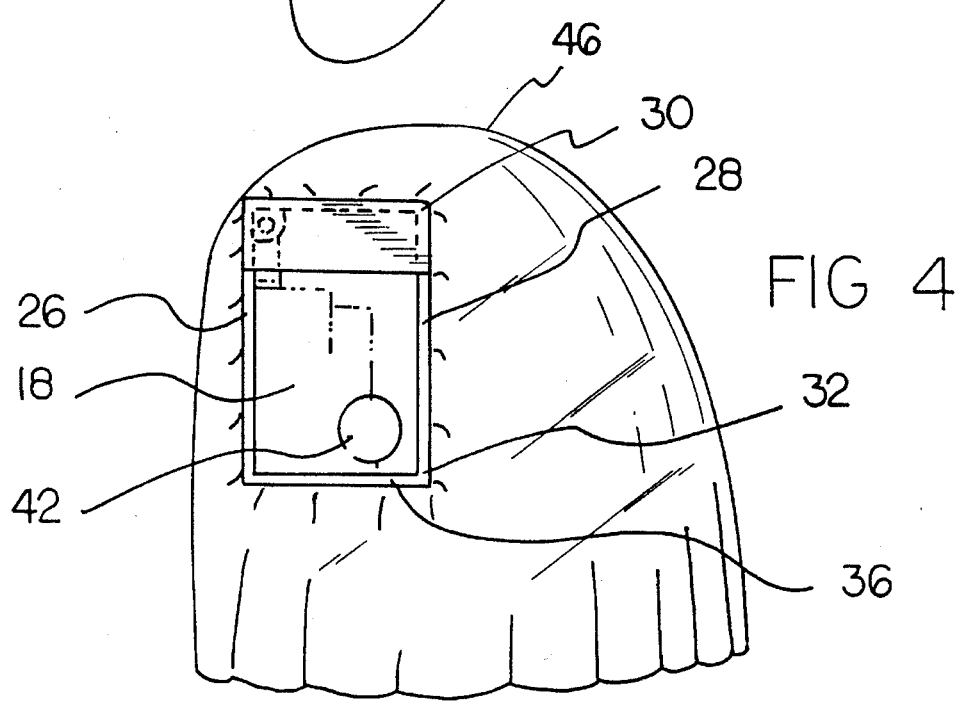

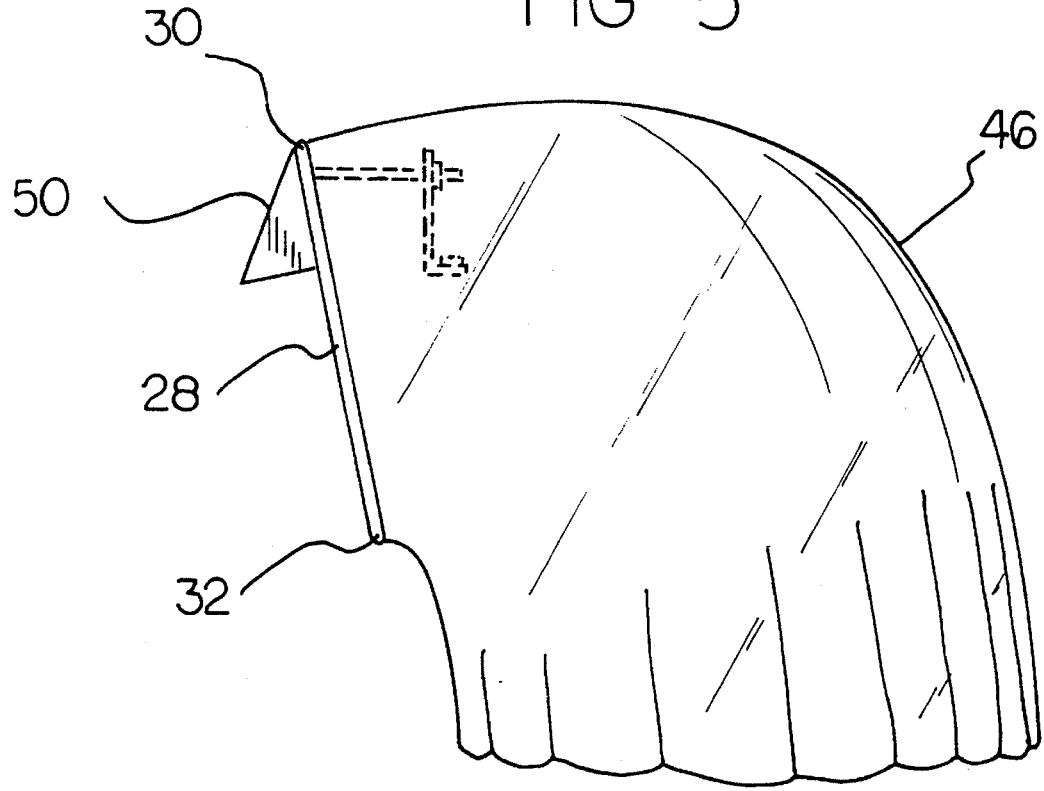
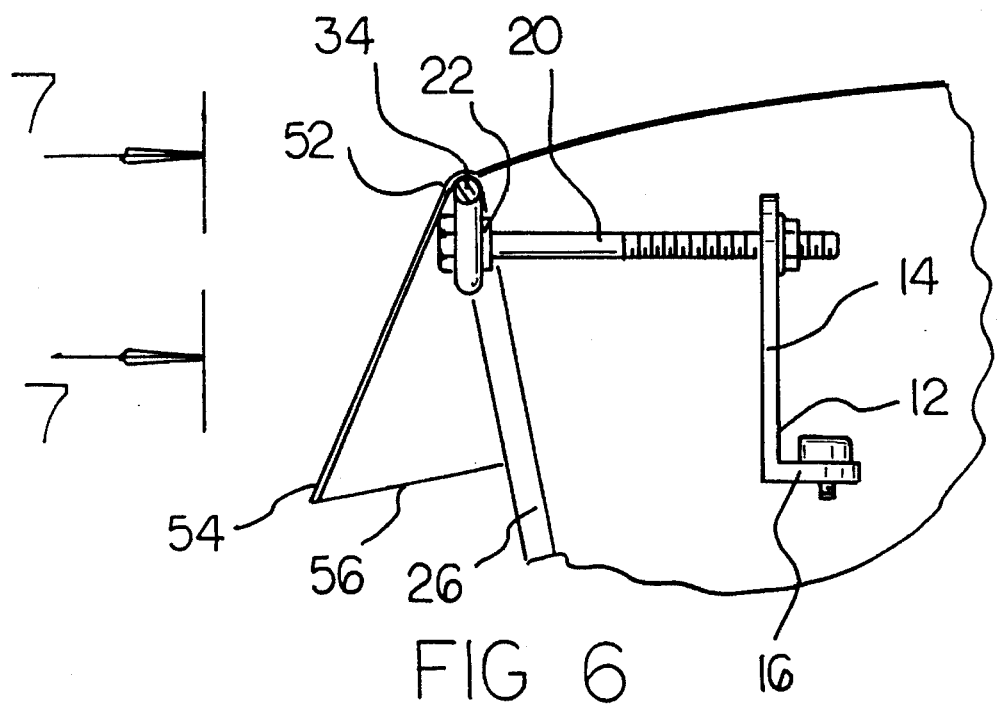

5,456,277

VIDEO CAMERA ENCLOSURE

BACKGROUND OF THE INVENTION

1. Field of the Invention

The present invention relates to a video camera enclosure and more particularly pertains to protecting a video camera from the elements with a video camera enclosure.

2. Description of the Prior Art

The use of weather-proofing apparatuses is known in the prior art. More specifically, weather-proofing apparatuses heretofore devised and utilized for the purpose of providing protection from weather are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,036,506 to Andresen, Jr. discloses a camera case for underwater photography.

U.S. Pat. No. 3,879,742 to Smith discloses a weatherproof enclosure for video camera or the like having centrifugal action window cleaner.

U.S. Pat. No. 4,033,392 to Less discloses a weatherproofing device for cameras.

U.S. Pat. No. 4,176,701 to Welgan discloses a camera rain shield.

U.S. Pat. No. Des. 256,515 discloses the ornamental design for a transparent rain bonnet or the like.

While these devices fulfill their respective, particular objective and requirements, the aforementioned patents do not describe a video camera enclosure for protecting a video camera from the elements.

In this respect, the video camera enclosure according to the present invention substantially departs from the conventional concepts and designs of the prior art, and in doing so provides an apparatus primarily developed for the purpose of protecting a video camera from the elements.

Therefore, it can be appreciated that there exists a continuing need for new and improved video camera enclosure which can be used for protecting a video camera from the elements. In this regard, the present invention substantially fulfills this need.

SUMMARY OF THE INVENTION

In the view of the foregoing disadvantages inherent in the known types of weather-proofing apparatuses now present in the prior art, the present invention provides an improved video camera enclosure. As such, the general purpose of the present invention, which will be described subsequently in greater detail, is to provide a new and improved video camera enclosure and method which has all the advantages of the prior art and none of the disadvantages.

To attain this, the present invention essentially comprises an L-shaped support bracket having an upper vertical extent and a lower horizontal extent. The lower horizontal extent is securable to a top portion of a video camera. The upper vertical extent has an aperture formed therethrough. An adjustable securement screw extends outwardly through the aperture in the upper vertical extent. The adjustable screw has a securement end. The adjustable securement screw is capable of extending outwardly in a variety of lengths. The device contains a rectangular support bracket having two side extents. Each of the two side extents has a proximal end and a distal end. Each proximal end has an upper extent theresecured. Each distal end has a lower extent theresecured. The rectangular support bracket has a hollow opening formed by the respective extents. The upper extent has a swiveling mechanism theresecured. The swiveling mechanism is secured to the securement end of the adjustable securement screw of the L-shaped support bracket. The swiveling mechanism serves to adjust the support bracket in relation to the video camera. A lens of the video camera aligns with the hollow opening. A flexible plastic enclosure is secured around the two side extents and the upper extent and the lower extent of the rectangular support bracket exposing only the hollow opening thereof. The plastic enclosure extends outwardly to encompass the video camera and a head of a user to protect the camera and the head from inclimate weather. The device contains a sunshield having an upper end, a lower end, and two side portions. The upper end is secured to the upper extent of the rectangular support bracket. The two side portions are secured to an upper portion of the two side extents of the rectangular support bracket. The lower end extends downwardly over the hollow opening of the rectangular support bracket thereby providing a shade for lens of the video camera.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved video camera enclosure which has all the advantages of the prior art weather-proofing apparatuses and none of the disadvantages.

It is another object of the present invention to provide a new and improved video camera enclosure which may be easily and efficiently manufactured and marketed.

It is a further object of the present invention to provide a new and improved video camera enclosure which is of durable and reliable construction.

An even further object of the present invention is to provide a new and improved video camera enclosure which is susceptible of a low cost of manufacture with regard to both materials and labor, and which accordingly is then susceptible of low prices of sale to the consuming public, thereby making such a video camera enclosure economically available to the buying public.

Still yet another object of the present invention is to provide a new and improved video camera enclosure which provides in the apparatuses and methods of the prior art some of the advantages thereof, while simultaneously overcoming some of the disadvantages normally associated therewith.

Even still another object of the present invention is to provide a new and improved video camera enclosure for protecting a video camera from the elements.

Lastly, it is an object of the present invention to provide a new and improved video camera enclosure comprised of an L-shaped support bracket that is securable to a top portion of a video camera. An adjustable securement screw extends outwardly from an upper vertical extent. The adjustable securement screw is capable of extending outwardly in a variety of lengths. Contained in the device is a rectangular support bracket having having a hollow opening. The support bracket is secured to the adjustable securement screw of the L-shaped support bracket. A lens of the video camera aligns with the hollow opening. A flexible plastic enclosure is secured around the rectangular support bracket exposing only the hollow opening thereof. The plastic enclosure extends outwardly to encompass the video camera and a head of a user to protect the camera and the head from inclimate weather.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the preferred embodiment of the video camera enclosure constructed in accordance with the principles of the present invention.

FIG. 4 is a front elevation view of the present invention.

FIG. 5 is a side elevation view of the present invention.

FIG. 6 is an enlarged side view of the adjustable bracket of the present invention.

The same reference numerals refer to the same parts through the various Figures.

DESCRIPTION OF THE PREFERRED EMBODIMENT

Figure 1:
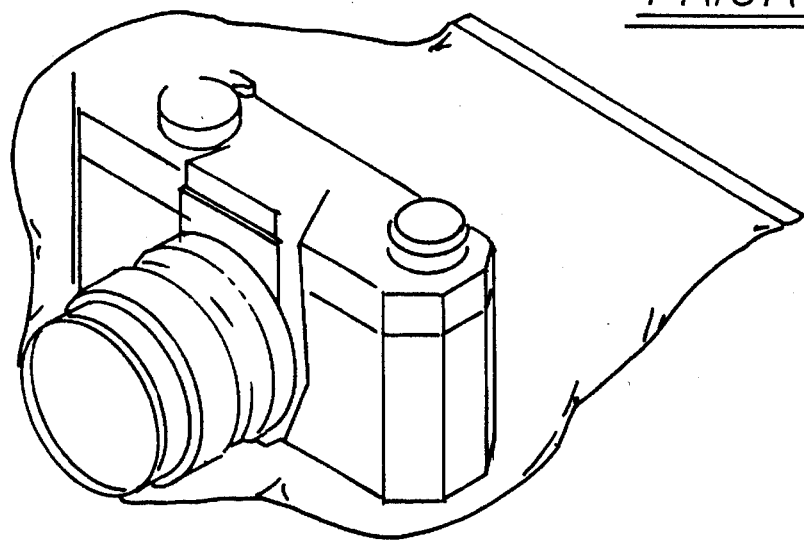
FIG. 1 is an isometric view of the prior art weatherproofing device for cameras.
Figure 2:
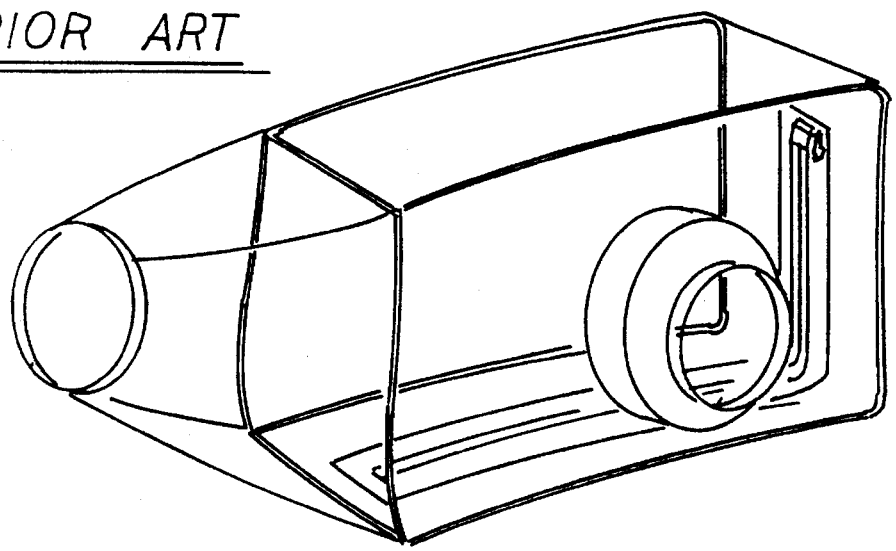
FIG. 2 is a partial isometric view of the prior art camera rain shield.
Figure 7:
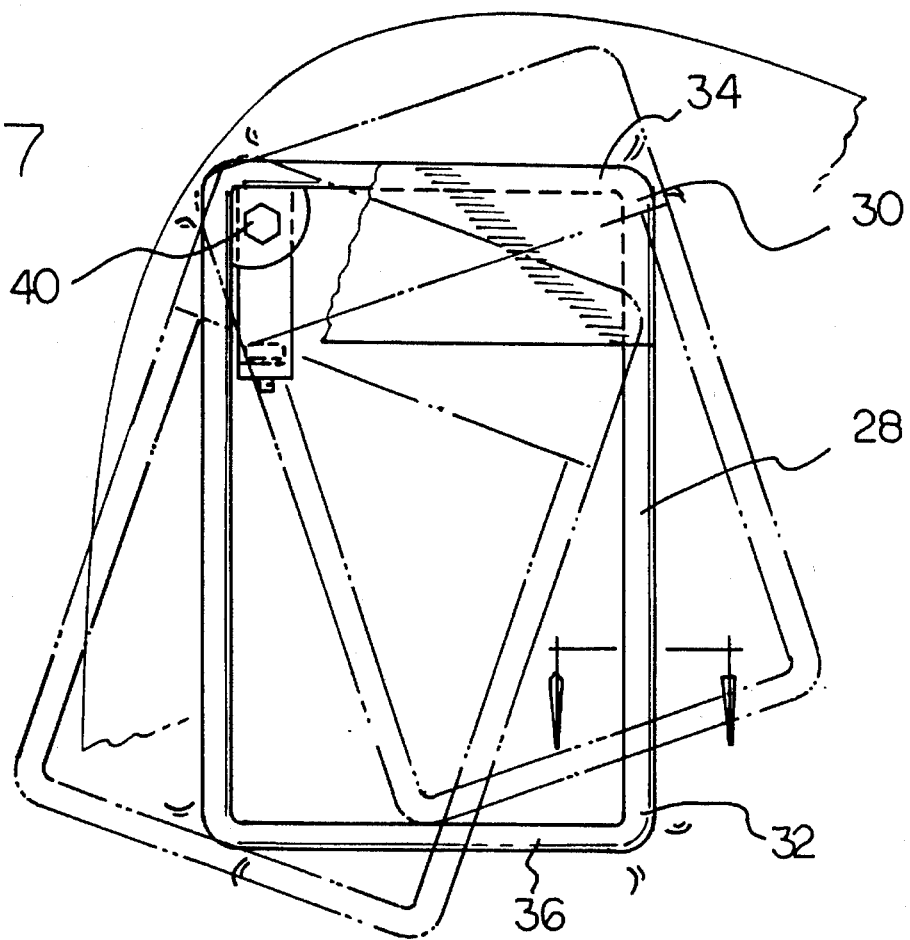
FIG. 7 is a sectional view of the present invention as taken along line 7—7 of FIG. 6.
Figure 8:
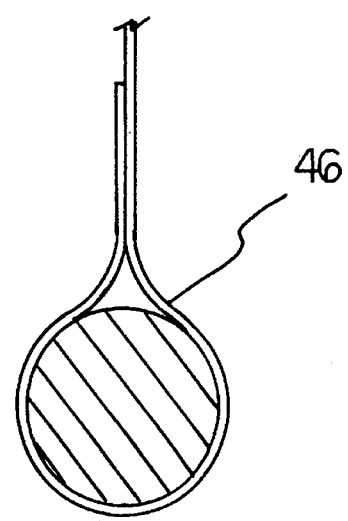
FIG. 8 is an enlarged sectional view of the enclosure coupled with the frame.

With reference now to the drawings, and in particular, to FIG. 3 thereof, the preferred embodiment of the new and improved video camera enclosure embodying the principles and concepts of the present invention and generally designated by the reference number 10 will be described.

Specifically, it will be noted in the various Figures that the device relates to a new and improved video camera enclosure for protecting a video camera from the elements. In its broadest context, the device consists of an L-shaped support bracket, a rectangular support bracket, a flexible plastic enclosure, and a sunshield.

The device 10 contains an L-shaped support bracket 12 having an upper vertical extent 14 and a lower horizontal extent 16. The lower horizontal extent 16 is securable to a top portion of a video camera 18. The upper vertical extent 14 has an aperture formed therethrough. An adjustable securement screw 20 extends outwardly through the aperture in the upper vertical extent 14. The adjustable screw 20 has a securement end 22. The adjustable securement screw 20 is capable of extending outwardly in a variety of lengths. The adjustable screw 20 is secured to the upper vertical extent 14 by a thumb screw that allows the user to easily adjust the length of the adjustable screw 20 to the user's preference.

The device 10 contains a rectangular support bracket 26 having two side extents 28. Each of the two side extents 28 has a proximal end 30 and a distal end 32. Each proximal end 30 has an upper extent 34 theresecured. Each distal end 32 has a lower extent 36 theresecured. The rectangular support bracket 26 has a hollow opening 38 formed by the respective extents 28,34,36. The upper extent 34 has a swiveling mechanism 40 theresecured. The swiveling mechanism 40 is secured to the securement end 22 of the adjustable securement screw 20 of the L-shaped support bracket 12. The swiveling mechanism 40 serves to adjust the support bracket 26 in relation to the video camera 18. A lens 42 of the video camera aligns with the hollow opening 38.

A flexible plastic enclosure 46 is secured around the two side extents 28 and the upper extent 34 and the lower extent 36 of the rectangular support bracket 26 exposing only the hollow opening 38 thereof. The plastic enclosure 46 extends outwardly to encompass the video camera 18 and a head of a user to protect the camera 18 and the head from inclimate weather.

The device 10 contains a sunshield 50 having an upper end 52, a lower end 54, and two side portions 56. The upper end 52 is secured to the upper extent 34 of the rectangular support bracket 26. The two side portions 56 are secured to an upper portion of the two side extents 28 of the rectangular support bracket 26. The lower end 54 extends downwardly over the hollow opening 38 of the rectangular support bracket 26 thereby providing a shade for lens 42 of the video camera 18.

The present invention is a flexible plastic enclosure 46 that fits over the head to protect a video camcorder 18 from the elements.

The enclosure 46 is supported on a bracket 12 which fits on the accessory shoe on top of most camcorders. It extends out beyond the recorder camera 18 to allow the lens 42 to pick up the scene and the sound. The length is adjusted with screws. A sunshield 50 projects over the opening to shade the lens 42 from direct sunlight. The size of the cover will vary with the make and type of camcorders. Eight millimeter equipment and small cassette units are much smaller than the standard cassette size recorders. Mylar plastic is used for the enclosure 46, and rigid plastics for the frame.

When rain, sleet, and snow is encountered, the cover is quickly slipped over the camera and adjusted if necessary, then placed over the head. The eyepiece is brought to the viewing eye and the camera is turned on to record the event.

The cover allows filming to proceed in spite of the elements. It protects the camera and prevents rain and snow from blurring the pictures taken. Camcorders are very expensive and somewhat fragile, with delicate electronics which can be damaged easily by rain. The enclosure should be relatively inexpensive and folds up compactly for storage in a small bag. The cinematographer is also protected to some degree from the elements.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A video camera enclosure for protecting a video camera from the elements comprising, in combination:

an L-shaped support bracket having an upper vertical extent and a lower horizontal extent, the lower horizontal extent securable to a top portion of a video camera, the upper vertical extent having an aperture formed therethrough, an adjustable securement screw extending outwardly through the aperture in the upper vertical extent, the adjustable screw having a securement end, the adjustable securement screw capable of extending outwardly in a variety of lengths;

a rectangular support bracket having two side extents, each of the two side extents having a proximal end and a distal end, each proximal end having an upper extent theresecured, each distal end having a lower extent theresecured, the rectangular support bracket having a hollow opening formed by the respective extents, the upper extent having a swiveling mechanism theresecured, the swiveling mechanism secured to the securement end of the adjustable securement screw of the L-shaped support bracket, the swiveling mechanism serving to adjust the support bracket in relation to the video camera, a lens of the video camera aligning with the hollow opening;

a flexible plastic enclosure secured around the two side extents and the upper extent and the lower extent of the rectangular support bracket exposing only the hollow opening thereof, the plastic enclosure extending outwardly to encompass the video camera and a head of a user to protect the camera and the head from inclimate weather;

a sunshield having an upper end, a lower end, and two side portions, the upper end secured to the upper extent of the rectangular support bracket, the two side portions secured to an upper portion of the two side extents of the rectangular support bracket, the lower end extending downwardly over the hollow opening of the rectangular support bracket providing a shade for lens of the video camera.

2. The enclosure as described in claim 1 and further including wherein the flexible plastic enclosure is a mylar plastic.

3. The enclosure as described in claim 2 and further including wherein the rectangular support bracket is constructed of rigid plastic.

4. A video camera enclosure for protecting a video camera from the elements comprising, in combination:

an L-shaped support bracket securable to a top portion of a video camera, an adjustable securement screw extending outwardly from an upper vertical extent, the adjustable securement screw capable of extending outwardly in a variety of lengths;

a rectangular support bracket having a hollow opening, the support bracket secured to the adjustable securement screw of the L-shaped support bracket, a lens of the video camera aligning with the hollow opening;

a flexible plastic enclosure secured around the rectangular support bracket exposing only the hollow opening thereof, the plastic enclosure extending outwardly to encompass the video camera and a head of a user to protect the camera and the head from inclimate weather.

5. The enclosure as described in claim 4 and further including a swiveling mechanism secured an upper extent of the rectangular support bracket, the swiveling mechanism secured to the adjustable securement screw of the L-shaped support bracket, the swiveling mechanism serving to adjust the support bracket in relation to the video camera.

6. The enclosure as described in claim 5 and further including a sunshield having an upper end, a lower end, and two side portions, the upper end secured to the upper extent of the rectangular support bracket, the two side portions secured to an upper portion of two side extents of the rectangular support bracket, the lower end extending downwardly over the hollow opening of the rectangular support bracket providing a shade for lens of the video camera.

* * * * *